(12) United States Patent
Lu et al.

(10) Patent No.: US 12,468,503 B1
(45) Date of Patent: Nov. 11, 2025

(54) SOUND CARD (71) Applicant: GUANGDONG DINGCHUANG SMART MANUFACTURING CO., LTD., Guangdong (CN)

(72) Inventors: Jun Lu, Guangdong (CN); Hong Zhou, Guangdong (CN); Weirong Li, Guangdong (CN); Shangjing Li, Guangdong (CN)

(73) Assignee: GUANGDONG DINGCHUANG SMART MANUFACTURING CO., LTD., Dongguan (CN)

( * ) Notice: Subject to any disclaimer, the term of this patent is extended or adjusted under 35 U.S.C. 154(b) by 0 days.

(21) Appl. No.: 18/945,821

(22) Filed: Nov. 13, 2024

(30) Foreign Application Priority Data

Sep. 7, 2024 (CN) .................. 202411254962.X
Sep. 7, 2024 (CN) .................. 202422199606.4

(51) Int. Cl.
| | |
|---|---|
| *G06F 3/16* | (2006.01) |
| *F21V 17/00* | (2006.01) |
| *F21V 33/00* | (2006.01) |
| *H04R 1/02* | (2006.01) |
| *H04R 3/00* | (2006.01) |

(52) U.S. Cl.
CPC ............ *G06F 3/162* (2013.01); *F21V 17/005* (2013.01); *F21V 33/0056* (2013.01); *G06F 3/165* (2013.01); *H04R 1/028* (2013.01); *H04R 3/00* (2013.01); *F21V 2200/00* (2015.01); *H04R 2420/05* (2013.01)

(58) Field of Classification Search
CPC ............. F21V 33/0056; F21V 2200/15; F21V 2200/10; F21V 2200/13; F21V 2200/20; F21V 17/162; F21V 17/104; F21V 17/005; F21V 17/164; G06F 3/162; G06F 3/165; G02B 6/001

See application file for complete search history.

(56) References Cited

U.S. PATENT DOCUMENTS

| | | | | |
|---|---|---|---|---|
| 5,285,037 A | * | 2/1994 | Baranski | H01H 13/023 200/314 |
| 5,959,610 A | * | 9/1999 | Silfvast | H01H 19/00 345/184 |
| 6,438,241 B1 | * | 8/2002 | Silfvast | H04H 60/04 84/625 |

(Continued)

*Primary Examiner* — Zheng Song
*Assistant Examiner* — James M Endo
(74) *Attorney, Agent, or Firm* — HOWARD M COHN and Associates, LLC (57) ABSTRACT

A sound card includes a shell, a control assembly, a light-emitting assembly and a light guide structure. The shell provided with an accommodating chamber. The control assembly includes a first circuit board arranged in the accommodating chamber. The light-emitting assembly arranged in the accommodating chamber and electrically connected to the first circuit board. The light-emitting assembly is configured to emit light. The light guide structure arranged in the shell. The light guide structure is configured to transfer the light emitted by the light-emitting assembly out of the shell. Compared with the sound card in the prior art, the light guide structure is used to transfer the light emitted by the light-emitting assembly out of the shell, so that a user can observe colorful light, a good lighting atmosphere is created, and a strong visual effect is achieved.

18 Claims, 9 Drawing Sheets

(56) References Cited

U.S. PATENT DOCUMENTS

| | | | | |
|---|---|---|---|---|
| 6,959,995 | B2* | 11/2005 | Ikarashi | G01D 11/28 |
| | | | | 362/555 |
| 11,449,153 | B1* | 9/2022 | Phillips | G06F 3/0238 |
| 2004/0109573 | A1* | 6/2004 | Haba | G10H 1/32 |
| | | | | 381/124 |
| 2005/0195997 | A1* | 9/2005 | Yang | H04R 3/00 |
| | | | | 381/119 |
| 2006/0060071 | A1* | 3/2006 | Kato | H04H 60/04 |
| | | | | 84/645 |
| 2008/0151539 | A1* | 6/2008 | Lee | G02B 6/0088 |
| | | | | 362/240 |
| 2009/0241759 | A1* | 10/2009 | Natsume | H01C 10/38 |
| | | | | 84/633 |
| 2011/0013786 | A1* | 1/2011 | Odom | H04R 5/04 |
| | | | | 381/119 |
| 2013/0234857 | A1* | 9/2013 | Yoshikawa | G10H 1/0066 |
| | | | | 340/652 |
| 2015/0078584 | A1* | 3/2015 | Moon | H03G 3/04 |
| | | | | 381/104 |
| 2015/0293909 | A1* | 10/2015 | Scherrer | H04H 20/61 |
| | | | | 381/74 |
| 2016/0069557 | A1* | 3/2016 | Rückgauer | F21V 5/007 |
| | | | | 361/689 |
| 2017/0324493 | A1* | 11/2017 | Christian | H04R 3/12 |
| 2017/0336550 | A1* | 11/2017 | Huang | G02B 6/0095 |
| 2018/0359464 | A1* | 12/2018 | Choi | H04N 17/00 |
| 2019/0394547 | A1* | 12/2019 | Lemons | H04R 1/028 |
| 2020/0044366 | A1* | 2/2020 | Tanaka | H05K 1/181 |
| 2020/0310008 | A1* | 10/2020 | Kim | G06F 1/16 |
| 2021/0224025 | A1* | 7/2021 | Takagi | G10H 1/34 |
| 2021/0286583 | A1* | 9/2021 | Saito | G06F 3/162 |

* cited by examiner

SOUND CARD

CROSS-REFERENCE TO RELATED APPLICATIONS

The application claims priority of Chinese Patent Application No. CN202411254962.X, filed on Sep. 7, 2024, and Chinese Patent Application No. CN202422199606.4, filed on Sep. 7, 2024, the entire contents of which are incorporated herein by reference.

TECHNICAL FIELD

The present disclosure relates to the technical field of external sound card structures, and in particular, to a sound card.

BACKGROUND

A sound card, also known as an audio card or sound effect card, is the most basic component of a computer multimedia system. It is a hardware that achieves mutual conversion of sound waves/digital signals. A basic function of the sound card is to convert original sound signals from a microphone, a tape, a compact disc, and the like, and output the signals to a sound device such as a headphone, a speaker, a loudspeaker, and a recorder, or to produce sounds of a synthetic instrument through a Musical Instrument Digital Interface (MIDI).

An external sound card is an audio jack device that is connected to a computer or a mobile device through a USB jack. It has the advantages of easy use and mobility, and is particularly suitable for environments that require better sound quality, such as connecting a laptop. The external sound card can provide richer jacks and higher sound quality, support various platform systems such as Windows, Mac, and iOS, and provide various jacks to meet different recording needs.

However, the existing external sound card has a single style and only provides the basic function, so that a user only has acoustic enjoyment during use, but there is no strong visual effect.

SUMMARY

An embodiment of the present disclosure provides a sound card, configured to be connected to an external device to achieve mutual conversion of sound waves/digital signals. The sound card includes:
  a shell, provided with an accommodating chamber;
  a control assembly, comprising a first circuit board arranged in the accommodating chamber;
  a light-emitting assembly, arranged in the accommodating chamber and electrically connected to the first circuit board, wherein the light-emitting assembly is configured to emit light; and
  a light guide structure, arranged in the shell, wherein the light guide structure is configured to transfer the light emitted by the light-emitting assembly out of the shell.

In an embodiment, the light guide structure includes first light guide members; the first light guide members are arranged on the shell; and the first light guide members are located on two or more side surfaces of the shell. The first light guide members are arranged on the side surfaces of the shell, which does not affect the use of the sound card and can further provide a dazzling lighting effect. It provides a visual effect for a user and enhances the user experience.

In an embodiment, a side surface of the shell is provided with a mounting hole communicated to the accommodating chamber; each first light guide member includes a main body portion and a first clamping portion connected to the main body portion; the main body portion is arranged in the mounting hole and is at least partially exposed out of the shell; the shell is provided with a second clamping portion on one side facing the accommodating chamber; and the first clamping portion is clamped with the second clamping portion. The main body portion is arranged at the shell to make the overall appearance of the product neater and more beautiful, and the first light guide member is mounted more firmly by clamping.

In an embodiment, each first light guide member further includes a limiting portion arranged on one side of the main body portion away from the first clamping portion, and a resisting portion connected to the main body portion; the limiting portion resists against the shell and is arranged in the accommodating chamber; and the resisting portion resists against the shell. A deformation portion is arranged between the resisting portion and the first clamping portion. The limiting portion is adjacent to or resists against a side plate and extends from the main body portion towards a bottom plate, so that the first light guide member is limited in the accommodating chamber and prevented from being removed from the mounting hole, thereby ensuring the mounting stability of the first light guide member. By the arrangement of the deformation portion to provide a deformation space during clamping and mounting, the assembling efficiency is improved, and wear between the resisting portion and the first clamping portion is reduced.

In an embodiment, the light guide structure further includes a first light shielding member; the first light shielding member is arranged in the accommodating chamber and is connected to the shell; and the light-emitting assembly is arranged between the light guide structure and the first light shielding member. A light guide chamber is further provided inside the shell; the first light guide members and the first light shielding member are arranged on a side wall of the light guide chamber; and light emitted by the light-emitting assembly is transferred out of the shell through the light guide chamber and the first light guide members. By the arrangement of the first light shielding member, the light emitted by the light-emitting assembly can only be transferred out of the shell through the light guide chamber and the first light guide members, thus avoiding the impact on other parts of the sound card and avoiding light leakage. The lighting atmosphere effect is better.

In an embodiment, the light-emitting assembly includes first light-emitting units electrically connected to the first circuit board; the first light-emitting units are configured to transfer the emitted light out of the shell via the first light guide members; the first light-emitting units are located in the light guide chamber; and the first light shielding member resists against the first circuit board. The first light-emitting units are arranged in the light guide chamber, which can allow the light emitted by the first light-emitting units to be directly transferred out of the shell through the first light guide members, thereby reducing the energy loss.

In an embodiment, the control assembly further include function keys; the function keys are arranged at the shell, are exposed out of the shell, and are electrically connected to the first circuit board; the function keys are configured to adjust an increase level of a signal input to the sound card, or adjust intensity of a signal output by the sound card, or enable or disable a mute function of the sound card. The arrangement of the function keys can better control or adjust the sound card, to improve the use efficiency.

In an embodiment, the function keys have light transmittance; the light-emitting assembly further includes second light-emitting units electrically connected to the first circuit board; and the second light-emitting units are arranged in the accommodating chamber and is configured to transfer the emitted light out of the shell through the function keys. By the arrangement of the second light-emitting units, the function keys can transmit light, so that a lighting atmosphere can be created, and a user can quickly recognize the function keys and operate the sound card in a dark environment.

In an embodiment, the shell is provided with a second light shielding member on one side facing the accommodating chamber; the second light shielding member is enclosed with the first circuit board to form a mounting chamber; the second light-emitting units are arranged in the mounting chamber; and a portion of each function key is arranged in the mounting chamber. By the arrangement of the second light shielding member, lighting atmospheres between the plurality of function keys do not affect each other, thereby enhancing the user experience.

In an embodiment, the shell includes a surface shell; the surface shell is provided with a control region; the control region includes a first control region and a second control region; and heights of the function keys, protruding out of the surface shell, in the first control region and the second control region decrease in sequence. The control region is arranged on the surface shell and is designed and divided into the first control region and the second control region, which can avoid misoperations. Moreover, the heights of the function keys in the first control region are greater than the heights of the function keys in the second control region, so that a user can easily distinguish the function keys in the two control regions during use. This enables the user to quickly identify a function key to be operated, thereby facilitating operation, saving time, and enhancing the user experience.

In an embodiment, the control region further includes a third control region; the third control region is adjacent to both the first control region and the second control region; and heights of the function keys, protruding out of the surface shell, in the first control region, the second control region, and the third control region decrease in sequence. By the arrangement of the third control region, the heights of the function keys are less than the heights of the function keys in the first control region and the second control region, so that the function keys are staggered with each other and does not affect each other during use, making it convenient for a user to distinguish and use the function keys.

In an embodiment, the sound card further includes a port assembly; and the port assembly is electrically connected to the first circuit board and is configured to be connected to the external device. The port assembly includes a headphone jack with a plugging detection function. By the arrangement of the headphone jack, a user can use a headphone, and the type of the plugged headphone can be quickly and automatically detected, so as to automatically adjust inputting of audio signals.

In an embodiment, the control assembly further includes a second circuit board; the second circuit board is electrically connected to the first circuit board; and the second circuit board is electrically connected to the port assembly and is stacked with the first circuit board. By the arrangement of the first circuit board and the second circuit board which are responsible for managing different functional modules, to better reduce the design burden of the first circuit board, fast feedback and processing on sound card operations can be achieved, and stable performance of processing audio and the like is ensured. Meanwhile, the electrical connection between the second circuit board and the port assembly can provide better compatibility during connection to an external device, thereby enhancing the user experience. Due to the stacking of the two circuit boards, the two circuit boards are placed at the top and bottom, which can effectively reduce the thickness of the product and effectively utilize an internal space of the shell, thus reducing the volume of the product and further reducing the production cost.

In an embodiment, the port assembly includes a microphone jack configured to input an audio signal; the control assembly further comprises a third circuit board; the third circuit board is electrically connected to the first circuit board; and the third circuit board is electrically connected to the microphone jack and is stacked with the first circuit board. By the arrangement of the third circuit board, an audio signal input from a microphone to the sound card can be better processed by the third circuit board, thereby outputting a better sound effect and enhancing the user experience. The stacking arrangement of the circuit boards can reduce the thickness and volume of the product, thereby reducing the production cost. Furthermore, the third circuit board corresponds to a mounting opening, which facilitates direct electrical connection of the microphone jack to the third circuit board and further ensures that the design position of the microphone jack is consistent with the design positions of other jacks on a side plate.

In an embodiment, the sound card further includes a mounting structure; the mounting structure is arranged at the shell and is configured to be detachably connected to the external device. The mounting structure is arranged at the shell, which can be detachably connected to an external device, so that the external sound card can be placed on a surface of an object, such as a desktop, for use, or, an external sound card can be mounted on an external equipment or an external device for use through the mounting structure. Therefore, there is no need to arrange a table and chairs separately, and only a device that is matched with the mounting structure of the external sound card is used. For example, a portable external device is plugged into the ground or mounted on external equipment to achieve supporting, so that the external sound card can be suspended for easy adjustment of positions and angles, and it is convenient for a user to operate the external sound card.

In an embodiment, the mounting structure includes a fastener configured to be detachably connected to the external device; the shell is provided with a connector; and the fastener is arranged at the connector. By the connection between the fastener and the connector, the fastener is connected to the shell for easy production and assembling.

In an embodiment, the fastener is a screw member having an internal thread; and the connector is a groove or hole provided in the shell; or, the fastener is a screw hole provided in the connector and having an internal thread. By use of the screw member or screw hole with the internal thread, the product has a simple and practical structure and low cost, is convenient to produce and assemble, and is conveniently connected to, mounted on, and removed from the external device.

Compared with the sound card in the prior art, which has the technical problems of single style and inability of achieving a strong visual effect, the sound card provided in the present disclosure, the light guide structure is used to transfer the light emitted by the light-emitting assembly out of the shell, so that a user can observe colorful light, a good lighting atmosphere is created, and a strong visual effect is achieved. Thus, when the user enjoys the auditory effect, a more three-dimensional atmosphere is created in conjunction with the visual effect, and the user experience is enhanced.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

DETAILED DESCRIPTION OF THE EMBODIMENTS

In order to facilitate understanding the present disclosure, the present disclosure will be described more comprehensively below with reference to related accompanying drawings. Preferred implementations of the present disclosure are provided in the drawings. However, the present disclosure can be implemented in many different forms, and are not limited to the implementations described herein. On the contrary, these implementations are provided to make the content disclosed in the present disclosure understood more thoroughly and comprehensively.

It should be noted that when an element is referred to as being "fixed to" another element, the element can be directly on another component or there can be a centered element. When an element is considered to be "connected" to another element, the element can be directly connected to another element or there may be a centered element. The terms "inner", "outer", "left", "right", and similar expressions used herein are for illustrative purposes only and do not necessarily represent the only implementation.

Unless otherwise defined, all technical and scientific terms used herein have the same meaning as those commonly understood by a person skilled in the art to which the present disclosure belongs. Terms used in the specification of the present disclosure herein are merely intended to describe objectives of the specific embodiments, but are not intended to limit the present disclosure. The term "and/or" used herein includes any and all combinations of one or more related listed items.

Figure 1:
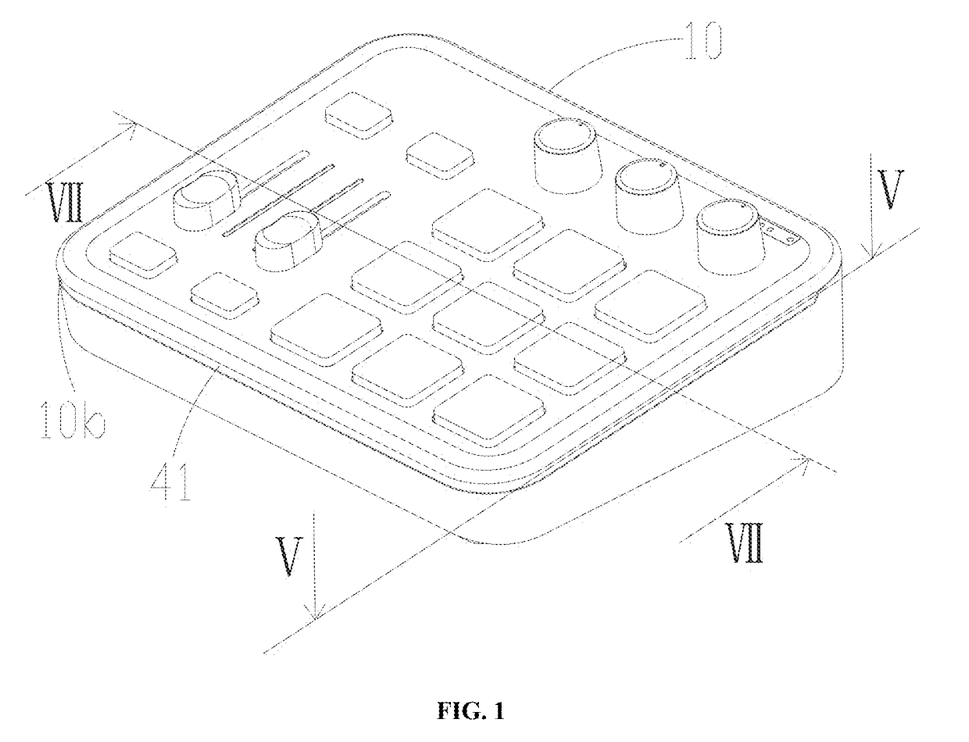
FIG. 1 is a three-dimensional diagram of a sound card according to an embodiment of the present disclosure.
Figure 2:
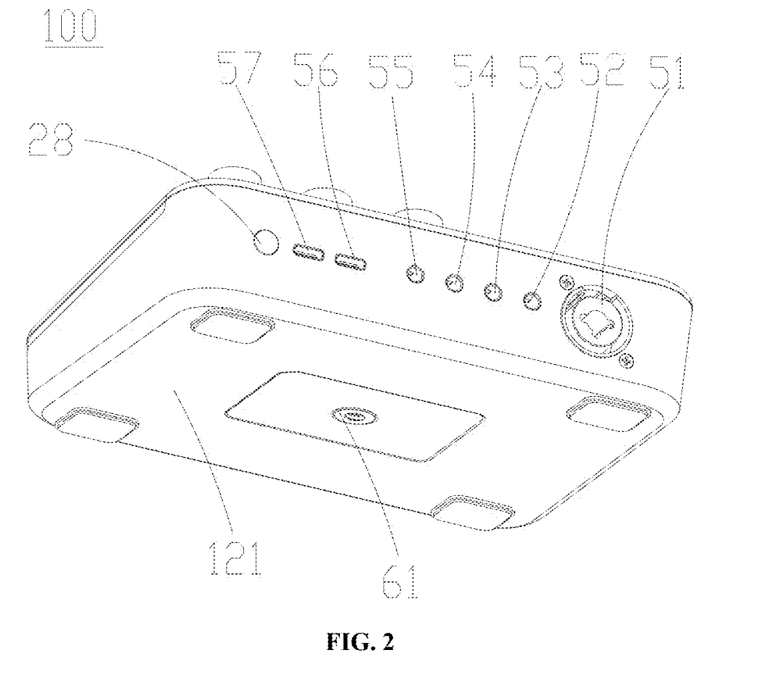
FIG. 2 is a three-dimensional diagram of a sound card in another angle according to an embodiment of the present disclosure.

Referring to FIG. 1 and FIG. 2, three-dimensional diagrams of a sound card 100 provided in an embodiment of the present disclosure in two angles. The sound card 100 provided in this embodiment of the present disclosure is configured to be connected to an external device to achieve mutual conversion of sound waves/digital signals. The external device includes, but is not limited to, a microphone, a computer, a tablet, a mobile phone, and another electronic device.

Figure 3:
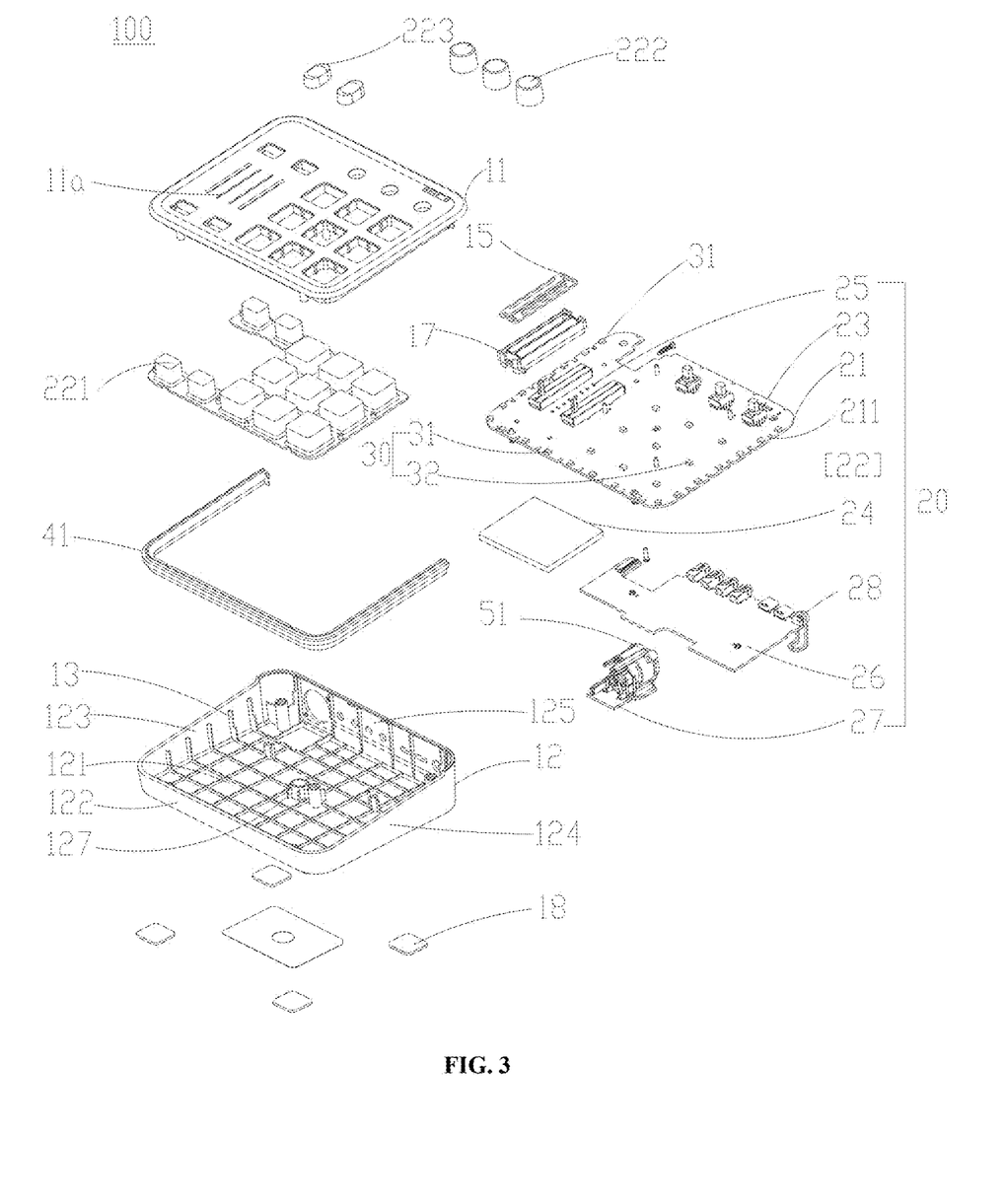
FIG. 3 is an exploded diagram of a sound card according to an embodiment of the present disclosure.
Figure 4:
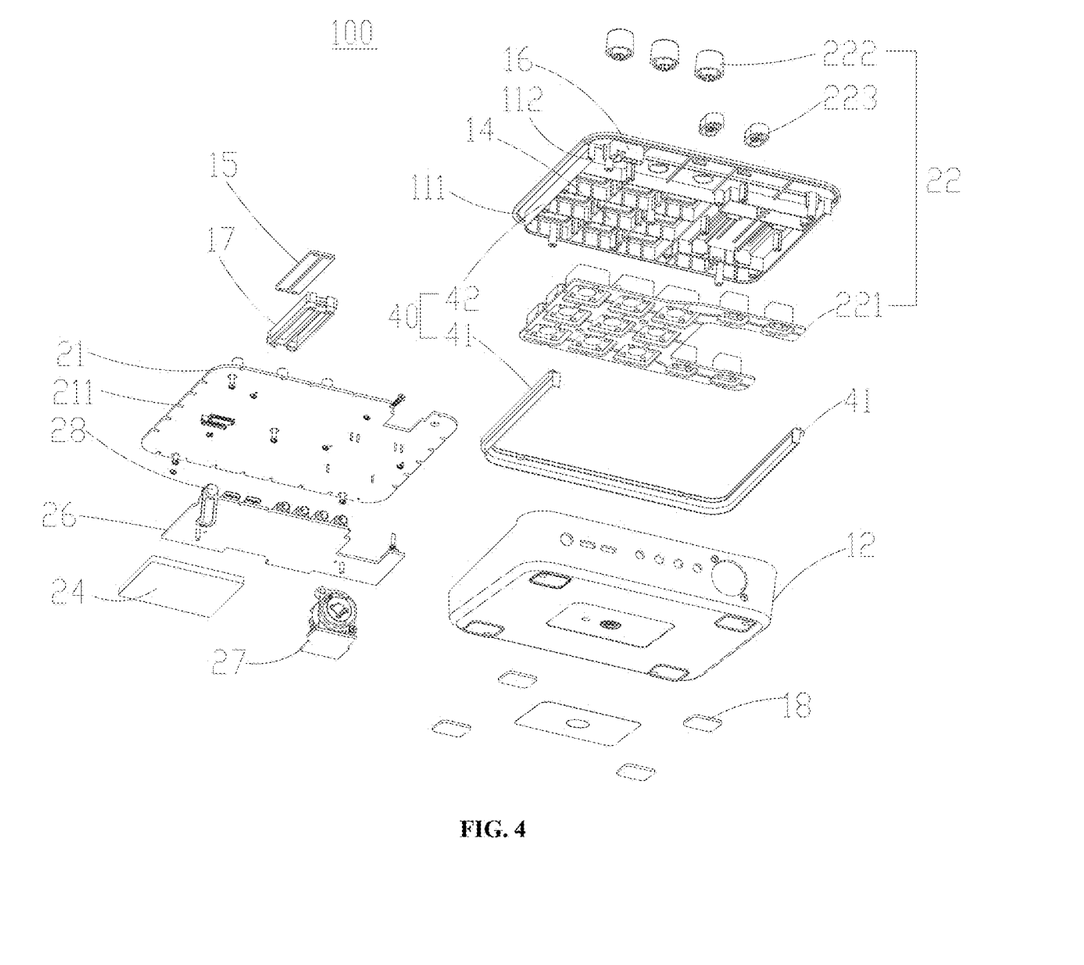
FIG. 4 is an exploded diagram of a sound card in another angle according to an embodiment of the present disclosure.
Figure 5:
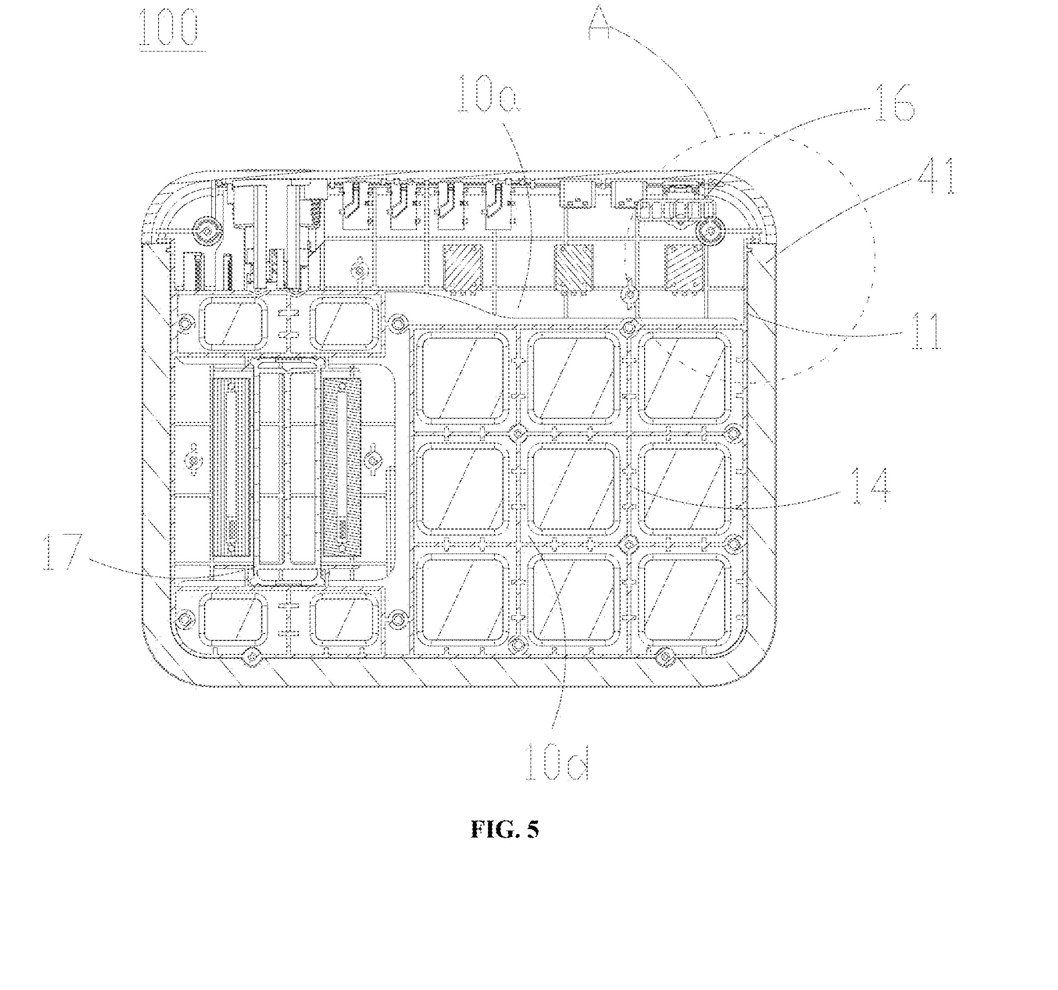
FIG. 5 is a cross-sectional diagram of the sound card shown in FIG. 1 along line V-V.

Referring to FIG. 3 to FIG. 5, the sound card 100 includes a shell 10, a control assembly 20, a light-emitting assembly 30, and a light guide structure 40. The shell 10 is provided with an accommodating chamber 10a. The control assembly 20 includes a first circuit board 21 arranged in the accommodating chamber 10a. The light-emitting assembly 30 is arranged in the accommodating chamber 10a and is electrically connected to the first circuit board 21. The light-emitting assembly 30 is configured to emit light. The light guide structure 40 is arranged in the shell 10. The light guide structure 40 is configured to transfer light emitted by the light-emitting assembly 30 out of the shell 10.

Compared with the prior art, the sound card 100 provided in the present disclosure uses the light guide structure 40 to transfer the light emitted by the light-emitting assembly 30 out of the shell 10, so that a user can observe colorful light, a good lighting atmosphere is created, and a strong visual effect is achieved. Thus, when the user enjoys the auditory effect, a more three-dimensional atmosphere is created in conjunction with the visual effect, and the user experience is enhanced.

Specifically, the light guide structure 40 is arranged at the shell 10, which means that it can be connected to the shell 10, arranged at the shell 1, or arranged in the accommodating chamber 10a in the shell 10. Alternatively, the light guide structure 40 is partially arranged at the shell 10 and partially arranged in the accommodating chamber 10a. The present disclosure will not specifically limit this.

In this embodiment, the shell 10 includes a surface shell 11 and a bottom shell 12. The surface shell 11 and the bottom shell 12 are connected to form the accommodating chamber 10a. Specifically, the bottom shell 12 includes a bottom plate 121 and side plates. The side plates are arranged along a circumferential edge of the bottom plate 121 and are connected to the surface shell 11. The side plates constitute four side surfaces of the shell 10. The side plates of the four side surfaces are defined as a first side plate 122, a second side plate 123, a third side plate 124, and a fourth side plate 125, respectively. The first side plate 122 and the fourth side plate 125 are arranged opposite to each other and are located on front and rear sides of the shell 10. The second side plate 123 and the third side plate 124 are arranged opposite to each other and are located on left and right sides of the shell 10. A height of the fourth side plate 125 is greater than a height of the first side plate 122, so that the sound card 100 has a shape with a lower front part and a higher rear part.

In this embodiment, mounting holes 10b are provided between the side plates and the surface shell 11. The first side plate 122, the second side plate 123, the third side plate 124, and the fourth side plate 125 are integrally formed. Specifically, after the assembling of the side plates and the surface shell 11 is completed, continuous mounting holes 10b communicated to the accommodating chamber 10a are provided between the first side plate 122, the second side plate 123, as well as the third side plate 124, and the surface shell 11. The light guide structure 40 includes first light guide members 41. The first light guide members 41 are arranged in the mounting holes 10b. The first light guide members 41 are arranged on the side surfaces of the shell 10, which does not affect the use of the sound card 100 and can further provide a dazzling lighting effect. It provides a visual effect for a user and enhances the user experience.

In this embodiment, the first light guide members 41 are light-transmittance rubber strips. The first light guide members 41 are arranged in the mounting holes 10b in a penetrating manner, and portions exposed out of the shell 10 respectively resist against the surface shell 11 and the side plates. To better present the lighting effect, the first light guide members 41 have a light filtering property, so that a portion of the light can be filtered out, and the emitted light is selectively transmitted to the outside. Transmitting light waves that a user can accept or likes achieves a better result. In this embodiment, the mounting hole 10b and the exposed portions of the first light guide members 41 are both of U-shaped structures.

In an embodiment, the mounting holes 10b and the first light guide members 41 may only be arranged on one side surface of the shell 10, such as a side surface of a side where the first side plate 122, the second side plate 123, or the third side plate 124 is located. Or, the mounting holes 10b and the first light guide members 41 can be arranged on two side surfaces of the shell 10, such as two side surfaces where the first side plate 122 and the second side plate 123, or the first side plate 122 and the third side plate 124, or the second side plate 123 and the third side plate 124 are located. The present disclosure does not specifically limit this.

In other embodiments, the mounting holes 10b may be arranged between the side plates and the bottom plate 121, or in middle positions of the side plates. In another embodiment, the side plates may also be overall made of a light-transmittance material, and serve as the first light guide members 41 for connecting the bottom plate 121 to the surface shell 11.

Referring to FIG. 5 to FIG. 10, in this embodiment, each first light guide member 41 includes a main body portion 411, a first clamping portion 412, a limiting portion 413, and a resisting portion 414. The main body portion 411 resists against the surface shell 11 and each side plate, and one side surface is exposed out of the shell 10. Specifically, an exposed outer surface of the main body portion 411 is flush with an outer surface of the side plate, making the appearance of the product more beautiful and neater.

Figure 9:
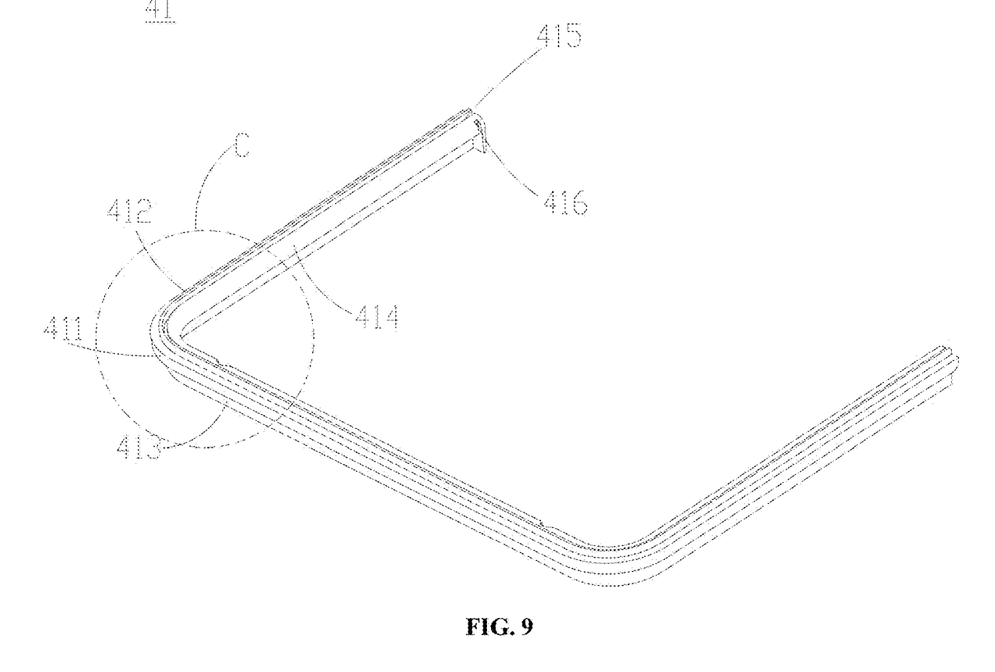
FIG. 9 is a three-dimensional diagram of a first light guide member of the sound card shown in FIG. 1.
Figure 10:
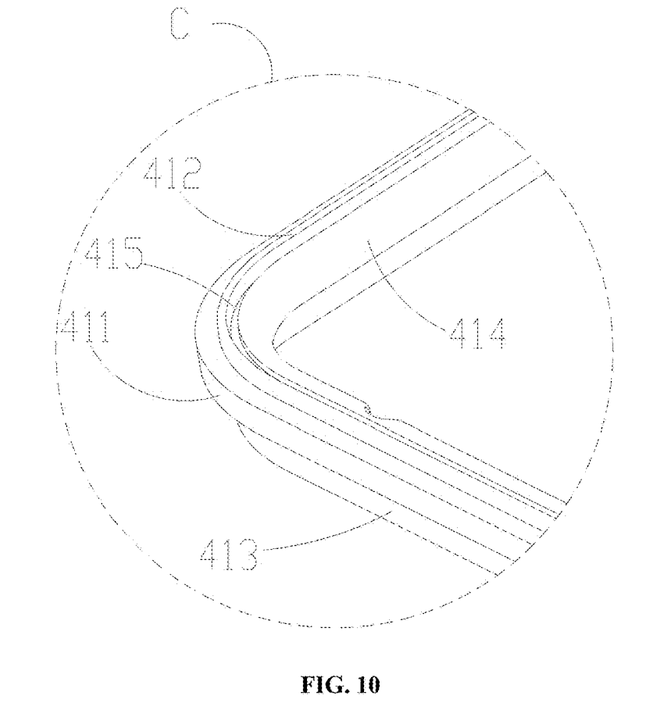
FIG. 10 is an enlarged view of part C of the first light guide member shown in FIG. 9.

The first clamping portion 412 is arranged on one side of the main body portion 411 and is clamped with a second clamping portion 111 on the surface shell 11, so that the first light guide member 41 and the surface shell 11 are mounted more firmly, and are simple in structure and easy to mount.

The limiting portion 413 is arranged on one side of the main body portion 411 away from the first clamping portion 412, and is adjacent to or resists against the side plate. The resisting portion 414 is arranged on the other side of the main body portion 411 and resists against the surface shell 11. A deformation portion 415 is provided between the resisting portion 414 and the first clamping portion 412. Specifically, the deformation portion 415 is a groove, so that when the first clamping portion 412 is clamped with the second clamping portion 111, there is a deformation space, which can improve the assembling efficiency and avoid damage to parts of the product. The first clamping portion 412, the limiting portion 413, and the resisting portion 414 are all arranged in the accommodating chamber 10a. The limiting portion 413 is adjacent to or resists against the side plate and extends from the main body portion 411 towards the bottom plate 121, so that the first light guide member 41 is limited in the accommodating chamber 10a and prevented from being removed from the mounting hole 10b, thereby ensuring the mounting stability of the first light guide member 41.

Figure 6:
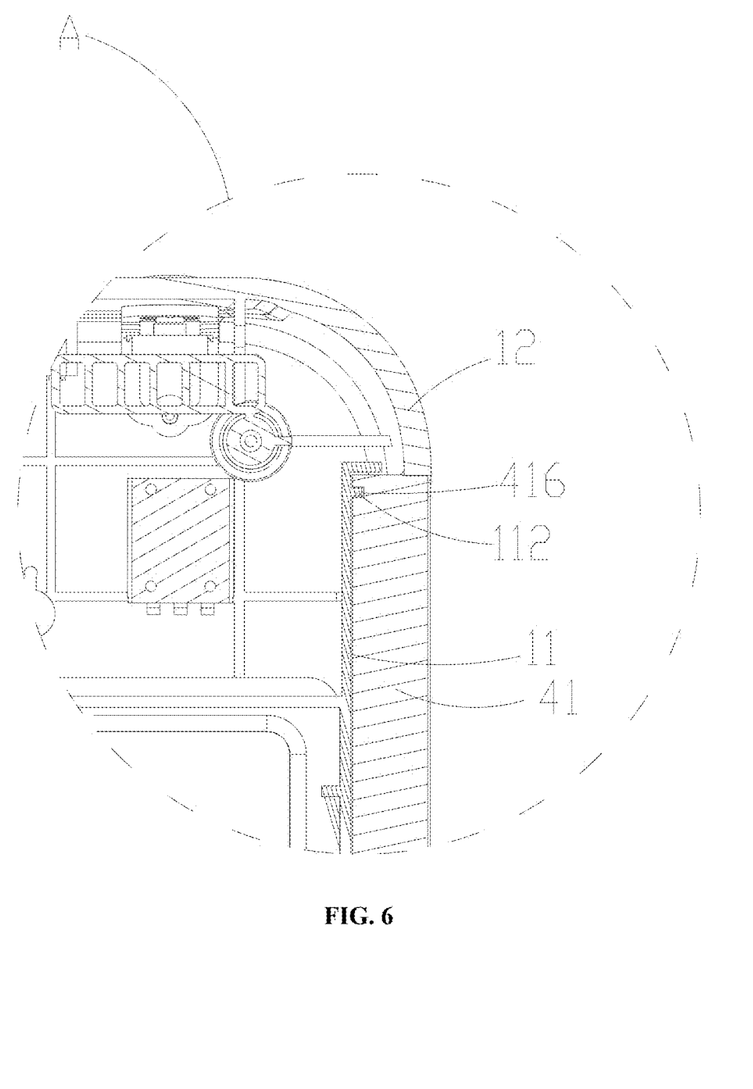
FIG. 6 is an enlarged view of part A of the sound card shown in FIG. 5.

To ensure the stability of connection between the first light guide member 41 and the shell 10, referring to FIG. 6, the first light guide member 41 is further provided with a third clamping portion 416. Specifically, a third clamping portion 416 is arranged on one side of the resisting portion 414 facing the surface shell 11, and a fourth clamping portion 112 is correspondingly arranged on the surface shell 11. The third clamping portion 416 is clamped with the fourth clamping portion 112. In this embodiment, the first clamping portion 412 is a clamping block; the second clamping portion 111 is a clamping slot; the third clamping portion 416 is a clamping slot; and the fourth clamping portion 112 is a clamping block. In other embodiments, the first clamping portion 412 and the fourth clamping portion 112 may also be clamping slots, and the second clamping portion 111 and the third clamping portion 416 may be clamping blocks. The present disclosure does not specifically limit this, as long as they can be clamped with each other.

Figure 7:
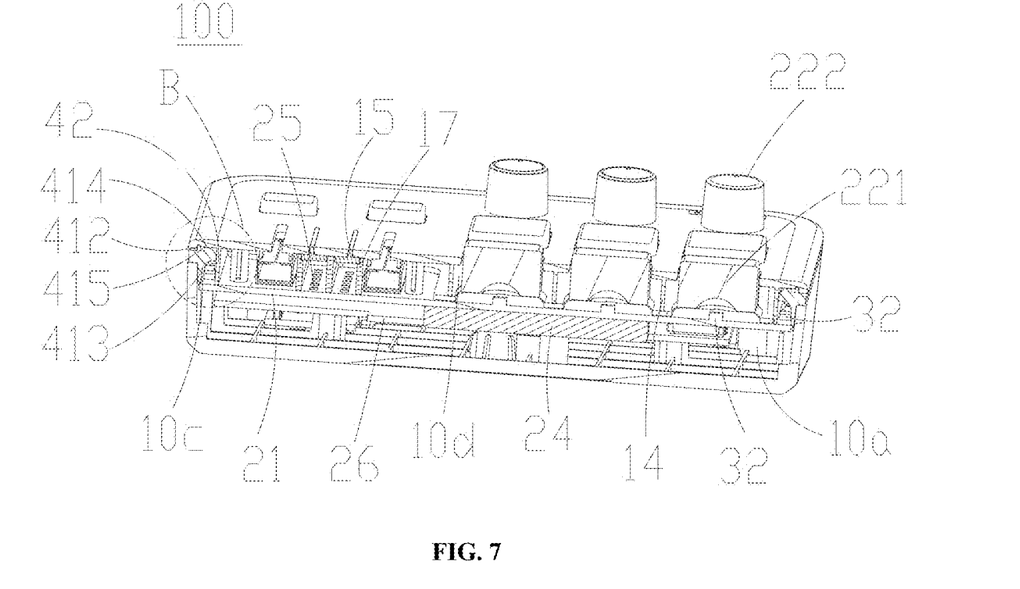
FIG. 7 is a cross-sectional diagram of the sound card shown in FIG. 1 along line VII-VII.
Figure 8:
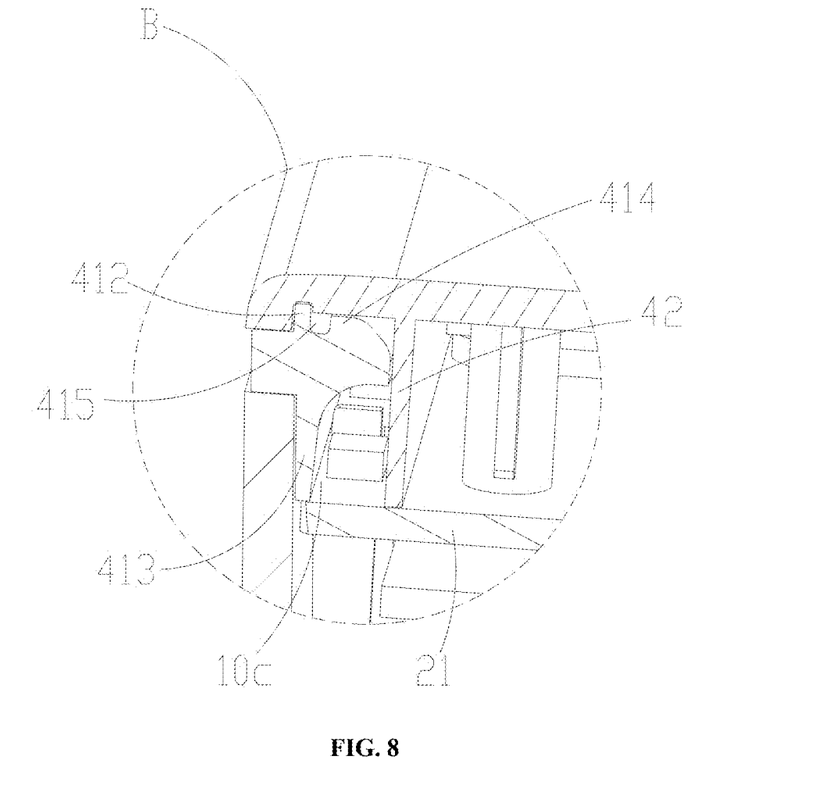
FIG. 8 is an enlarged view of part B of the sound card in FIG. 7.

Referring to FIG. 7 and FIG. 8, the resisting portion 414 resists against the surface shell 11, and one side of the main body portion 411 facing the accommodating chamber 10a and one side of the limiting portion 413 facing the accommodating chamber 10a are cambered surfaces. To prevent the light emitted by the light-emitting assembly 30 from dissipating to the outside through other positions of the shell 10 and to improve the lighting atmosphere effect, in this embodiment, each light guide structure 40 further includes a first light shielding member 42. The first light shielding member 42 is a baffle plate, which is arranged in the accommodating chamber 10a, is connected to the surface shell 11, and resists against the resisting portion 414 of the first light guide member 41, thereby enclosing a light guide chamber 10c. The light emitted by the light-emitting assembly 30 is transferred out of the shell 10 through the first light guide members 41 in the light guide chamber 10c.

Specifically, the light-emitting assembly 30 includes first light-emitting units 31 electrically connected to the first circuit board 21; the first light-emitting units 31 are arranged in the light guide chamber 10c; and the first light-emitting units 31 are configured to transfer the emitted light out of the shell 10 through the first light guide members 41. The first light-emitting units 31 are arranged in the light guide chamber 10c, which can allow the light emitted by the first light-emitting units 31 to be directly transferred out of the shell 10 through the first light guide members 41, thereby reducing the energy loss.

In this embodiment, the first light-emitting units 31 are arranged at an edge portion of the first circuit board 21. The first light shielding member 42 resists against the first circuit board 21, and one end, away from the first clamping portion 412, of the limiting portion 413 of each first light guide member 41 resists against the first circuit board 21. The edge portion of the first circuit board 21 is enclosed with the first light shielding member 42 and the first light guide members 41 to form the light guide chamber 10c, and the light emitted by the first light-emitting units 31 is transferred out of the shell 10 through the first light guide members 41. Specifically, each first light-emitting unit 31 is a light-emitting diode (LED) light bead configured to emit light in various colors. In other embodiments, the first light-emitting unit 31 may be arranged on one side of the first light shielding member 42 facing the light guide chamber 10c. The present disclosure will impose no limitation on specific arrangement positions of the first light-emitting units 31, as long as the light is exported through the first light guide member 41.

Continuing with reference to FIG. 3 and FIG. 7, in this embodiment, a limiting plate 13 is further arranged on the bottom shell 12. A limiting slot 211 is correspondingly provided in the edge portion of the first circuit board 21. A portion of the limiting plate 13 extends into the limiting slot 211, thereby ensuring correct mounting of the first circuit board 21 and avoiding wear or damage to other elements due to movement after mounting. In this embodiment, a size of the first circuit board 21 is roughly equivalent to a size of the bottom plate 121.

In an embodiment, an edge of the first circuit board 21 can also directly resist against the side plates, and the first light shielding member 42, the edge portion of the first circuit board 21, the side plate, and the first light guiding member 41 are enclosed to form a light guide chamber 10c.

In an embodiment, the first light-emitting units 31 can also be arranged at an edge portion of the bottom plate 121 adjacent to the side plate, and the first light shielding member 42, the edge portion of the bottom plate 121, the side plates, and the first light guiding members 41 are enclosed to form a light guide chamber 10c. In a changed embodiment of this embodiment, the limiting portion 413 of the first light guide member 41 can also directly resist against the bottom plate 121, so that the first light guide members 41, the bottom plate 121, and the first light shielding member 42 are enclosed to form a light guide chamber 10c.

In another embodiment, the resisting portion 414 of each first light guide member 41 may not resist against the first light shielding member 42. The first light-emitting units 31 may be arranged on the surface shell 11. The surface shell 11, the first light shielding member 42, the first light guide members 41, the side plates, and the edge portion of the bottom plate 121 or the first circuit board 21 are enclosed to form a light guide chamber 10c. In a changed embodiment of this embodiment, the limiting portion 413 of each first light guide member 41 can directly resist against the bottom plate 121, so that the surface shell 11, the first light shielding member 42, the first light guide members 41, and the bottom plate 121 are enclosed to form a light guide chamber 10c.

Continuing with reference to FIG. 3 and FIG. 4, in this embodiment, the control assembly 20 further includes function keys. The function keys are arranged at the shell 10 and exposed out of the shell 10, and are electrically connected to the first circuit board 21. The function keys are configured to adjust an increase level of a signal input to the sound card 100 or intensity of a signal output by the sound card 100, or to enable or disable a mute function of the sound card 100. The arrangement of the function keys can better control or adjust the sound card 100, to improve the use efficiency.

Specifically, the function keys include buttons 221, knobs 222, and push keys 223. The function keys are all arranged in holes on the surface shell 11 in a penetrating manner and are exposed out of the shell 10 for user control, such as pressing, rotating, pushing, and pulling. For ease of description and understanding, referring to FIG. 11, in this embodiment, the surface shell 11 is divided into four control regions: a first control region 1a, a second control region 1b, a third control region 1c, and two fourth control regions 1d. The knobs 222 are arranged in the first control region 1a. The first control region 1a is located at a portion of the surface shell 11 close to the fourth side plate 125. The push keys 223 are arranged in the second control region 1b. The second control region 1b is arranged at a portion of the surface shell 11 close to the second side plate 123. Some of the buttons 221 are arranged in the third control region 1c. The third control region 1c is arranged at a portion of the surface shell 11 close to the third side plate 124. Some of the buttons 221 are arranged in the two fourth control regions 1d. The two fourth control regions 1d are arranged at two opposite ends of the third control region 1c, and are respectively located at portions of the surface shell 11 close to the first side plate 122 and the fourth side plate 125. Specifically, heights of the knobs 222 protruding out of the shell 11 are the greatest, followed by the push keys 223 and then the buttons 221. Due to the arrangement of the function keys in the four control regions on the surface shell 11 in this way, the function keys on the surface shell 11 can be staggered, without affecting each other during use, making it convenient for a user to distinguish and use the function keys. For example, when a knob 222 needs to be spun, a user can directly find the highest first control region 1a and operate the knob 222. When a push key 223 needs to be pushed, a user can directly find out the highest push key 223 on the second control region on the left and operate it. When a pressing operation needs to be performed, a user directly finds the third control region 1c or the fourth control region 1d with the lowest function keys.

Figure 11:
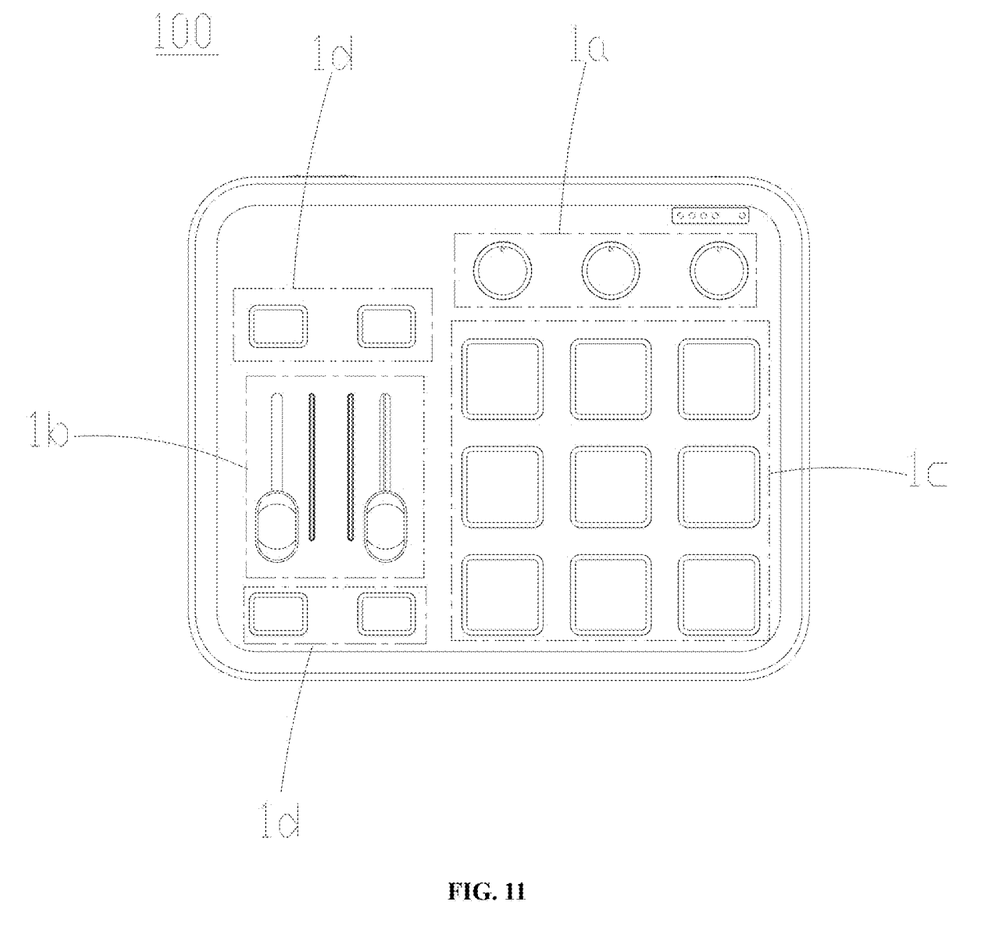
FIG. 11 is a schematic diagram of a control region on a surface shell of the sound card shown in FIG. 1.

In this embodiment, three knobs 222, two push keys 223, and 13 buttons 221 are included. Nine buttons 221 are arranged in a nine-grid pattern in the third control region 1c, and the remaining four buttons 221 are arranged in pairs in the two fourth control regions 1d.

For ease of understanding, this embodiment will provide a brief description of the various function keys.

The functions of the two push keys 223 are respectively configured to control a volume of a microphone or accompaniment connected to the sound card 100. For example, one push key controls a volume of an XLR microphone, and the other push key controls a volume of a Bluetooth input, 3.5 mm input, and USB-C downlink accompaniment audio.

One knob 222 is configured to control a gain of a Gain microphone, such as controlling a gain of the XLR microphone. One knob 222 controls Reverb, specifically, controlling the strength of the reverb effect. The reverb effect is turned off when the knob is turned to the most left side. One knob 222 controls a headphone, for example, controlling a volume output by "headphone" and "earpiece" jacks through the knob 222.

The buttons 221 located in the fourth control region 1d has functions of controlling mute of the microphone, mute of the accompaniment, power switching of the microphone, on and off of a Bluetooth accompaniment connection function, and the like.

The buttons 221 located in the third control region 1c have functions, including: voice cancel ON/OFF (dodge), monitoring ON/OFF (inside playback ON/OFF), a inflexion mode, a noise reduction function, a glare mode (a light-emitting mode of the first light-emitting units 31), and four custom function buttons 221, which can customize light brightness, recording, recording clearing, and other functions.

To enhance the glare effect and see the buttons 221 in a dark environment for easy user operation, the buttons 221 has light transmittance. The light-emitting assembly 30 includes second light-emitting units 32 electrically connected to the first circuit board 21. The second light-emitting units 32 are arranged in the accommodating chamber 10a, and the emitted light is transferred out of the shell 10 through the function keys. Specifically, each second light-emitting unit 32 is an LED light bead configured to emit light in various colors. The second light-emitting units 32 are arranged on one side of the first circuit board 21 facing the buttons 221. Due to a large number of the buttons 221, the number of the second light-emitting units 32 corresponds to the number of the button 221, so that each button 221 can transmit light.

Referring to FIG. 3 and FIG. 7, due to a large number of the buttons 221 and a large number of the second light-emitting units 32, and adjacent arrangement, to avoid the light emitted by the second light-emitting units 32 from affecting the lighting efficiency of other adjacent buttons 221, a second light shielding member 14 is arranged on one side of the surface shell 11 facing the accommodating chamber 10*a*. The second light shielding member 14 is a baffle plate. The second light shielding member 14 is enclosed with the first circuit board 21 to form a mounting chamber 10*d*. The second light-emitting units 32 are arranged in the mounting chamber 10*d*, and at least some of the function keys are arranged in the mounting chamber 10*d*. In this embodiment, partial structures of the buttons 221 are arranged between the second light shielding member 14 and the first circuit board 21, thereby separating the them and avoiding damage to the first circuit board 21 by the second light shielding member 14. By the arrangement of the second light shielding member 14, the light emitted by the second light-emitting units 32 can be limited in the mounting chamber 10*d* where the second light-emitting units are located. In this way, the light emitted by the second light-emitting units 32 can only be transferred out of the shell 10 through the buttons 221 mounted in the mounting chamber 10*d*.

Due to the colors of the light emitted by the second light-emitting units 32, the buttons 221 can transmit light with different colors, so that the buttons 221 can present different colors when pressed, and can also achieve an indication effect. For example, if the button 221 that controls the mute of the microphone displays a red lighting effect after being pressed, it means that the microphone has been muted. When the button is pressed again to cancel the mute function, the red lighting effect on the button 221 disappears, indicating that the mute function has been canceled. Due to the large number of buttons 221 and relationships between the buttons 221 and corresponding lighting effects, the present disclosure does not list them one by one. In this embodiment, the second light-emitting units 32 not only allow the buttons 221 to transmit different lighting effects and enhance the lighting effect of the sound card 100, but also achieve a prompting effect to indicate states of the corresponding functions after the buttons 221 are pressed.

Referring to FIG. 3 and FIG. 4, in this embodiment, the control assembly 20 further includes a first indicator lamp 23 and a battery 24 electrically connected to the first circuit board 21. The first indicator lamp 23 is arranged on the surface shell 11 in a penetrating manner to display a battery level of the battery 24. The battery 24 is arranged in the accommodating chamber 10*a*. In the sound card 100 provided in this embodiment, there are a plurality of first indicator lamps 23. Five first indicator lamps are taken as an example. When the battery level of the battery 24 is greater than 75%, four first indicator lamps 23 will be turned on. When the battery level of the battery 24 is less than 75% and greater than or equal to 50%, three first indicator lamps 23 will be turned on. When the battery level of the battery 24 is less than 50% and greater than 25%, two first indicator lamps 23 will be turned on. When the battery level of the battery 24 is less than or equal to 25%, one first indicator lamp 23 will be turned on. In other embodiments, other indication forms can be used. For example, the plurality of first indicator lamps 23 are classified into four sections, and a current battery level of the battery 24 is displayed in a columnar shape, representing battery levels of 20%, 40%, 60%, and 80% of the battery 24, respectively. A specific instruction for is not specifically limited in the present disclosure.

To avoid the light emitted by the first indicator lamps 23 from affecting the lighting effects of the surrounding buttons 221, a third light shielding member 16 is further arranged on outer sides of the first indicator lamps 23. The third light shielding member 16 is arranged around the first indicator lamps 23 and resists against the surface shell 11 and the first circuit board 21. The first indicator lamps 23 are arranged on the first circuit board 21 to ensure that the light of the first indicator lamps 23 can only be transmitted to the outside through the surface shell 11.

Since the main function of the push keys 223 is to control the volume, in order to more intuitively display the adjustment of the volume by the push keys 223, in this embodiment of the present disclosure, the control assembly 20 further includes a second indicator lamp 25. The second indicator lamp 25 is electrically connected to the first circuit board 21. Specifically, the second indicator lamp 25 is arranged on one side of the first circuit board 21 facing the surface shell 11 and is adjacent to the push keys 223. Specifically, the second indicator lamp 25 is arranged on the first circuit board 21 between the two push keys 223. The second indicator lamp 25 is an LED light bead configured to emit light in various colors. A light-transmittance gap 11*a* is arranged at a position, corresponding to the second indicator lamp 25, on the surface shell 11, so that the light emitted by the second indicator lamp 25 can be transmitted out of the surface shell 11 through the light-transmittance gap 11*a*. There are two second indicator lamps 25, which respectively correspond to the two push keys 223. The light emitted by the second indicator lamps 25 can indicate a volume size, such as the intensity of a signal of a speaker or a microphone, and whether it is overloaded can be indicated using different colors.

To make the light emitted by the second indicator lamps 25 softer, a second light guide member 15 is arranged in the light-transmittance gap 11*a*. The second light guide member 15 is a light-transmittance rubber strip that can transmit relatively soft light, so that a user feels more comfortable during observation. Meanwhile, to avoid the light emitted by the second indicator lamps 25 from affecting the surrounding function keys, a fourth light shielding member 17 is further arranged between the surface shell 11 and the first circuit board 21. The fourth light shielding member 17 is arranged around the second indicator lamps 25, and the second light guide member 15 is arranged on one side of the fourth light shielding member 17 facing the surface shell 11, so as to guide the light emitted by the second indicator lamps 25 out of the surface shell 11 through the second light guide member 15.

Referring to FIG. 2, FIG. 3, and FIG. 4, the sound card 100 further includes a port assembly; and the port assembly is electrically connected to the first circuit board 21 and is configured to be connected to the external device. Specifically, the port assembly includes a microphone jack 51, an earpiece jack 52, an accompaniment jack 53, a headphone jack 54, a linear output jack 55, a data jack 56, and a power jack 57. The port assemblies are all arranged in holes of the fourth side plate 125.

The microphone jack 51 is an XLR or 6.35 mm general-purpose microphone jack, supporting inputting of a dynamic microphone with an XLR jack or a 6.35 mm plug.

The earpiece jack 52 supports inputting of mobile phone and gaming earpieces with 3.5 mm TRRS plugs. It has a plugging detection function. This jack automatically blocks an XLR signal input when a four-section earpiece is plugged. If a three-section headphone and other non-earpiece device are plugged, the XLR/6.35 mm microphone jack 51 is still used as an audio input.

The accompaniment jack 53 is configured to be connected to an audio signal input of an external audio device such as a mobile phone, a tablet, a decoder, and a player. It supports an audio playing device such as a mobile phone and an MP3 player to transmit an audio signal to the sound card 100 through an AUX audio cable.

The headphone jack 54 supports both a mobile phone/gaming earpiece (with a TRRS plug) and a regular earpiece (with a TRS plug). After being connected to the sound card 100, it can monitor sounds of various audio channels on the sound card 100.

The linear output jack 55 is a 3.5 mm unidirectional stereo output jack, which is configured to be connected to a speaker and other audio devices.

The data jack 56 is a USB-C data jack configured for uplink and downlink audio signals. The data jack 56 is further configured to serve as a power jack of the sound card 100.

The power jack 57 is a DC power jack 57, which is configured to be connected to an external power supply to supply power to the sound card 100.

In this embodiment, when both the earpiece jack 52 and the headphone jack 54 are used simultaneously, there are sounds output, which improves the applicability of the sound card 100 and enhances the user experience.

In this embodiment, the control assembly 20 further includes an ON/OFF button 28. The ON/OFF button 28 is arranged in a hole of the fourth side plate 125 and is electrically connected to the first circuit board 21. The ON/OFF button is configured to power on and power off the sound card 100.

Referring to FIG. 3 and FIG. 4, to enhance the functionality and control effect of the sound card 100, in this embodiment of the present disclosure, the control assembly 20 further includes a second circuit board 26. The port assembly and the ON/OFF button 28 are both electrically connected to the second circuit board 26, and the second circuit board 26 is electrically connected to the first circuit board 21. By the arrangement of the second circuit board 26, the port assembly can be better controlled, thereby providing a better sound effect. Specifically, the second circuit board 26 is arranged between the first circuit board 21 and the bottom plate 121, and is parallel to the first circuit board 21.

To further enhance the sound effect of the microphone connected to the sound card 100, the control assembly 20 is further provided with a third circuit board 27 electrically connected to the microphone jack 51. The third circuit board 27 is arranged between the second circuit board 26 and the bottom plate 121, and is electrically connected to the second circuit board 26. The third circuit board 27 is arranged on one side of the second circuit board 26 away from the first circuit board 21. The three circuit boards are stacked, and a space is reserved between every two circuit boards. By the separate arrangement of the third circuit board 27 for the microphone jack 51, an audio signal input from the microphone to the sound card 100 can be better processed by the third circuit board 27, thereby outputting a better sound effect and enhancing the user experience.

Referring to FIG. 2 and FIG. 3, in this embodiment of the present disclosure, the bottom shell 12 is further provided with a mounting structure. The mounting structure is configured to be detachably connected to a connection structure of the external device, thereby mounting the sound card 100 on the external device, to support the sound card 100. This enlarges the application scope and expands application scenarios.

Specifically, the mounting structure includes a fastener 61 configured to be detachably connected to the external device; the shell 10 is provided with a connector 127; and the fastener 61 is arranged at the connector 127. By the connection between the fastener 61 and the connector 127, the fastener 61 is connected to the shell 10 for easy production and assembling.

For ease of use and cost reduction, the fastener 61 is a screw member having an internal thread; and the connector 127 is a groove or hole provided in the shell 10. Specifically, the connector 127 is arranged on the bottom plate 121. In this embodiment, the fastener 61 can be connected to the connector 127 through adhesive bonding, interference fit, welding, riveting, or screw connection, as long as the fastener 61 can be firmly connected to the connector 127.

In an embodiment, the fastener 61 is a screw hole provided in the connector 127 and having an internal thread. Namely, the fastener 61 can be provided as an internal thread in a groove or hole on the bottom plate 121, and is integrally formed with bottom plate 121. By use of the screw member or screw hole with the internal thread, the product has a simple and practical structure and low cost, is convenient to produce and assemble, and is conveniently connected to, mounted on, and removed from the external device.

It can be understood that to facilitate the use and reduce the cost, the screw hole of the fastener 61 uses a commonly-used conventional standard screw hole and uses a metric or inch thread. Specifically, a diameter of the screw hole is not limited in the present disclosure and can be designed according to a need.

When the connector 127 is set as a groove or hole, to enhance the strength of the bottom plate 121 and avoid the bottom plate 121 from being broken, the connector 127 protrudes slightly towards one side of the bottom plate 121 away from the accommodating chamber 10*a*, and extends a distance towards one side of the connector 127 facing the accommodating chamber 10*a*, thereby ensuring the strength of the bottom plate 121 and the strength of the mounted fastener 61. Meanwhile, to further enhance the strength of the bottom plate 121, a reinforcement rib is arranged on the side of the bottom plate 121 facing the accommodating chamber 10*a*.

In other embodiments, the mounting structure may be a buckle or a buckle slot or another detachable connection structure, as long as it can achieve detachable connection to the external device. The present disclosure will not impose any specific limitation.

To prevent the sound card 100 from shaking or moving during control when the sound card 100 is used, in this embodiment, the bottom plate 121 is further provided with an anti-slip pad 18. The anti-slip pad 18 is specifically a silica gel pad. The silica gel pad is provided with anti-slip lines to increase a friction force between the sound card 100 and an external supporting object such as a desktop, thereby ensuring that shaking or movement of the sound card 100 can be avoided during use.

The various technical features in the foregoing embodiments may be randomly combined. For concise description, not all possible combinations of the various technical features in the above embodiments are described. However, provided that combinations of these technical features do not conflict with each other, the combinations of the various technical features are considered as falling within the scope of this specification. The foregoing embodiments merely express several implementations of the present disclosure. The descriptions thereof are relatively specific and detailed, but are not understood as limitations on the scope of the present disclosure. A person of ordinary skill in the art can also make several transformations and improvements without departing from the idea of this application. These transformations and improvements fall within the protection scope of this application. Therefore, the protection scope of the patent of this application shall be subject to the appended claims.

What is claimed is:

1. A sound card, configured to be connected to an external device to achieve mutual conversion of sound waves/digital signals, wherein the sound card comprises:
    a shell, provided with an accommodating chamber;
    a control assembly, comprising a first circuit board arranged in the accommodating chamber;
    a light-emitting assembly, arranged in the accommodating chamber and electrically connected to the first circuit board, wherein the light-emitting assembly is configured to emit light; and
    a light guide structure, arranged in the shell, wherein the light guide structure is configured to transfer the light emitted by the light-emitting assembly out of the shell;
    wherein the light guide structure comprises first light guide members arranged in the shell, and exposed on two or more side surfaces of the shell; and the control assembly comprises a plurality of light transmittable function keys protruding from the shell; the function keys are electrically connected to the first circuit board, and are configured to adjust an increase level of a signal input to the sound card, or adjust intensity of a signal output by the sound card, or enable or disable a mute function of the sound card; and
    wherein the light-emitting assembly comprises a plurality of first light-emitting units located at edges of the first circuit board, and a plurality of second light-emitting units located on the first circuit board with the first light-emitting units surrounding the second light-emitting units, the first light-emitting units and second light-emitting units are electrically connected to the first circuit board, the first light-emitting units are configured to transfer the emitted light out of the shell via the first light guide members, and the second light-emitting units are configured to transfer the emitted light out of the shell through the function keys.

2. The sound card according to claim 1, wherein a side surface of the shell is provided with a mounting hole communicated to the accommodating chamber; each first light guide member comprises a main body portion and a first clamping portion connected to the main body portion; the main body portion is arranged in the mounting hole; a portion of the main body portion is exposed out of the shell; the shell is provided with a second clamping portion on one side facing the accommodating chamber; and the first clamping portion is clamped with the second clamping portion.

3. The sound card according to claim 2, wherein each first light guide member further comprises a limiting portion arranged on one side of the main body portion away from the first clamping portion, and a resisting portion connected to the main body portion; the limiting portion resists against the shell and is arranged in the accommodating chamber; and the resisting portion resists against the shell.

4. The sound card according to claim 3, wherein a deformation portion is arranged between the resisting portion and the first clamping portion.

5. The sound card according to claim 1, wherein the light guide structure further comprises a first light shielding member; the first light shielding member is arranged in the accommodating chamber and is connected to the shell; and the light-emitting assembly is arranged between the light guide structure and the first light shielding member.

6. The sound card according to claim 5, wherein a light guide chamber is further provided inside the shell; the first light guide members and the first light shielding member are arranged on a side wall of the light guide chamber; and when the light-emitting assembly emits light, the light is transferred out of the shell through the light guide chamber and the first light guide members.

7. The sound card according to claim 6, wherein the first light-emitting units are arranged in the light guide chamber; and the first light shielding member resists against the first circuit board.

8. The sound card according to claim 1, wherein the shell is provided with a second light shielding member on one side facing the accommodating chamber; the second light shielding member is enclosed with the first circuit board to form a mounting chamber; the second light-emitting units are arranged in the mounting chamber; and a portion of each function key is arranged in the mounting chamber.

9. The sound card according to claim 1, wherein the shell comprises a surface shell; the surface shell is provided with a control region; the control region comprises a first control region and a second control region; and heights of the function keys, protruding out of the surface shell, in the first control region and the second control region decrease in sequence.

10. The sound card according to claim 9, wherein the control region further comprises a third control region; the third control region is adjacent to both the first control region and the second control region; and heights of the function keys, protruding out of the surface shell, in the first control region, the second control region, and the third control region decrease in sequence.

11. The sound card according to claim 1, wherein the sound card further comprises a port assembly; and the port assembly is electrically connected to the first circuit board and is configured to be connected to the external device.

12. The sound card according to claim 11, wherein the port assembly comprises a headphone jack with a plugging detection function.

13. The sound card according to claim 11, wherein the control assembly further comprises a second circuit board; the second circuit board is electrically connected to the first circuit board; and the second circuit board is electrically connected to the port assembly and is stacked with the first circuit board.

14. The sound card according to claim 11, wherein the port assembly comprises a microphone jack configured to input an audio signal; the control assembly further comprises a third circuit board; the third circuit board is electrically connected to the first circuit board; and the third circuit board is electrically connected to the microphone jack and is stacked with the first circuit board.

15. The sound card according to claim 1, wherein the sound card further comprises a mounting structure; the mounting structure is arranged at the shell and is configured to be detachably connected to the external device.

16. The sound card according to claim 15, wherein the mounting structure comprises a fastener configured to be detachably connected to the external device; the shell is provided with a connector; and the fastener is arranged at the connector.

17. The sound card according to claim 16, wherein the fastener is a screw member having an internal thread; and the connector is a groove or hole provided in the shell; or,
the fastener is a screw hole provided in the connector and having an internal thread.

18. An external sound card, configured to be connected to an external device to achieve mutual conversion of sound waves/digital signals, wherein the external sound card comprises:
a shell, provided with an accommodating chamber and a port assembly to be connected to the external device;
a control assembly, comprising a first circuit board arranged in the accommodating chamber;
a light-emitting assembly, arranged in the accommodating chamber and electrically connected to the first circuit board, wherein the light-emitting assembly is configured to emit light;
a light guide structure, arranged in the shell, and exposed on two or more side surfaces of the shell, wherein the light guide structure is configured to transfer the light emitted by the light-emitting assembly out of the shell; and
a plurality of light transmittable function keys electrically connected to the first circuit board, and exposed out of the shell; the function keys are configured to adjust an increase level of a signal input to the sound card, or adjust intensity of a signal output by the sound card, or enable or disable a mute function of the sound card;
wherein the light-emitting assembly comprises first light-emitting units and second light-emitting units surrounded by the first light-emitting units, the first light-emitting units are configured to transfer the emitted light out of the shell via the light guide structure, and the second light-emitting units are configured to transfer the emitted light out of the shell through the function keys.

* * * * *